United States Patent [19]
Stöck et al.

[11] Patent Number: 5,954,457
[45] Date of Patent: Sep. 21, 1999

[54] HAND-HELD DEVICE

[75] Inventors: Maximilian Stöck, Azmoos, Switzerland; Ferdinand Kristen, Gilching; Arno Thiel, Uffing, both of Germany

[73] Assignee: Hilti Aktiengesellschaft, Schaan, Liechtenstein

[21] Appl. No.: 08/967,989

[22] Filed: Nov. 12, 1997

[30] Foreign Application Priority Data

Nov. 11, 1996 [DE] Germany ............................ 196 46 381

[51] Int. Cl.[6] .................................................. B23B 45/00
[52] U.S. Cl. ................................... 408/6; 408/9; 408/124
[58] Field of Search ............................. 408/6, 8, 9, 124

[56] References Cited

U.S. PATENT DOCUMENTS

| 2,941,414 | 3/1960 | Lee | 408/139 |
|---|---|---|---|
| 3,135,137 | 6/1964 | Cunningham | 408/124 |
| 3,649,129 | 3/1972 | King | 408/139 |
| 4,085,337 | 4/1978 | Moeller | 408/124 |
| 4,090,802 | 5/1978 | Bilz | 408/6 |
| 5,155,473 | 10/1992 | Oketani et al. | 408/6 |
| 5,584,619 | 12/1996 | Guzzella | 408/6 |

Primary Examiner—Daniel W. Howell
Assistant Examiner—Rouzbeh Tabaddor
Attorney, Agent, or Firm—Anderson, Kill & Olick, P.C.

[57] ABSTRACT

A motor-operated hand-held device (1), such as a drilling device, has a rotary spindle 6 located in and projecting out of a housing (2). Rotational movement of a driving motor (8) is transmitted to a tool (7) situated in an end of the rotary spindle (6). A safety device (11) within the housing (2) prevents deflection of the housing about an axis (A) of the rotary spindle (6) in the event the tool (7) becomes suddenly jammed. The safety device (11) can be activated by a detection device (12) if the tool becomes jammed. The safety device (11) is located inside the housing 2 adjacent to the rotary spindle (6) and is formed of at least two component parts which cooperate in frictional engagement in the event the device is activated. One of the component parts is connected to the housing (2) and the other is connected to the rotary spindle (6). In the event the tool (7) becomes jammed, the component parts of the safety device (11) couple the housing (2) and the rotary spindle (6) so that the two parts are fixed so that they do not rotate relative to one another. Further, an overload slip clutch (10) is located in a drive (9) for the rotary spindle (6) and is arranged in series with the safety device (11).

8 Claims, 2 Drawing Sheets

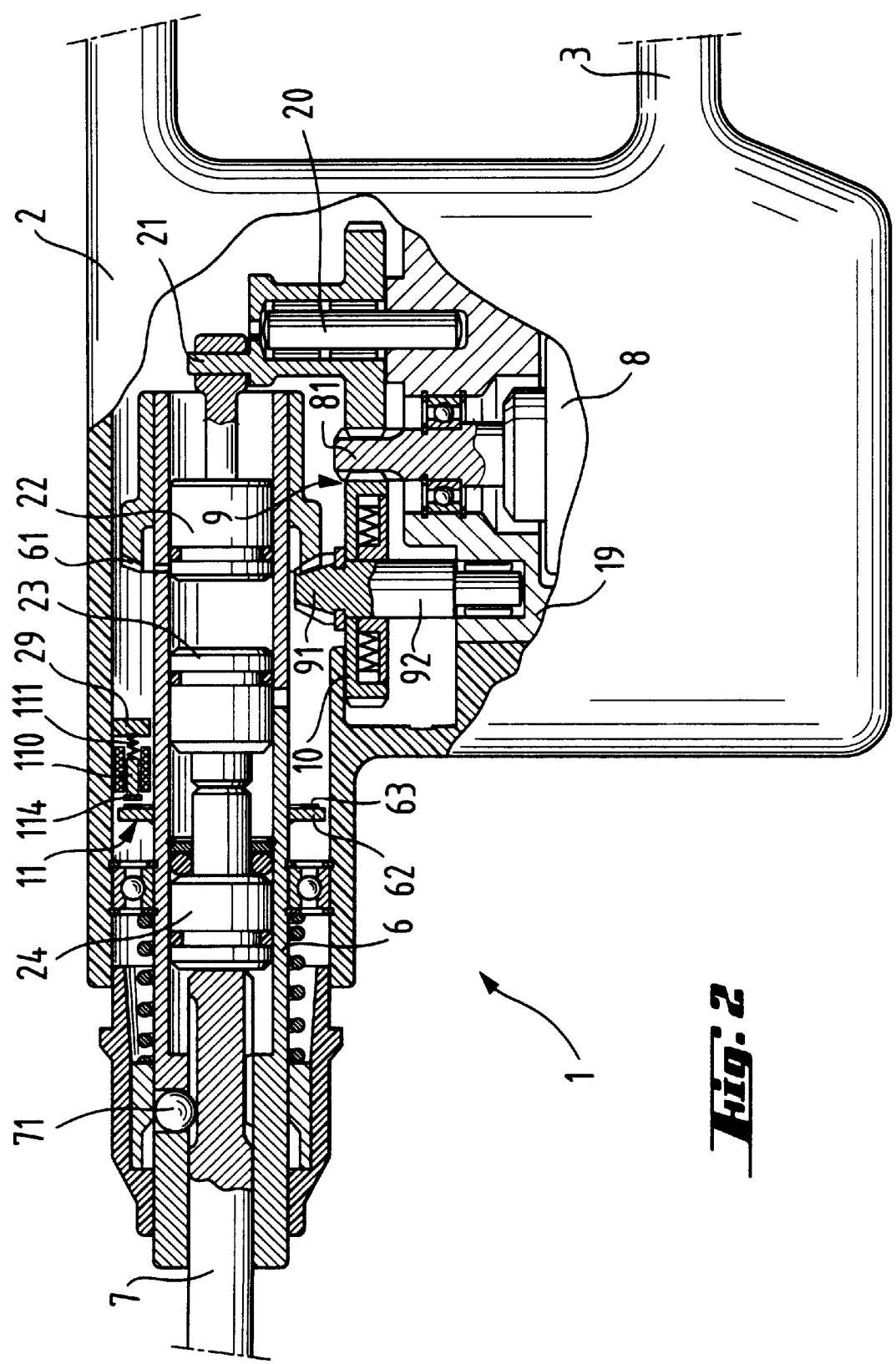

HAND-HELD DEVICE

BACKGROUND OF THE INVENTION

The present invention is directed to a motor-operated hand-held device, such as a drilling device, including the housing with a rotary spindle located in the housing and projecting out of it for transmitting rotational movement from a driving motor to a tool secured in the rotary spindle. A safety device is provided for preventing deflection of the housing of the hand-held device about the axis of the rotary spindle if the tool suddenly becomes locked or jammed. The safety device can be activated by a detection device in the event the tool becomes jammed.

Hand-held devices of the generic type, such as drilling devices or cutting and grinding devices, are used primarily by professional craftsmen, but also to an increasing degree by non-professionals for home use. Operation of such hand-held devices entails the risk that the tool held in the rotary spindle will become jammed as a result of improper operation on the part of the operator or user, or, for example, when striking reinforcing steel while drilling holes in reinforced concrete. The sudden locking of the rotary spindle causes high reaction torques which lead to a deflection of the housing about the rotary spindle axis. Normally, the tool operator is unprepared for such a reaction and is taken by surprise by the deflection of the hand-held device and may lose his grip on the device, or, when working at elevated positions, such as on scaffolds and ladders, can lose his balance and fall, which could result in serious injury.

To avoid such situations, in the past, various steps have been proposed using the principal of an inert mass to insure that the housing and the jammed tool are coupled so as to be fixed with respect to rotation relative to one another, when the hand-held device is deflected. An example of such a solution is found in DE A 43 00 021. In the hand-held device described in this patent publication, a mechanical locking bar is proposed which is connected with the housing for blocking the rotary spindle by a positive engagement, this mechanical locking bar being activated via an inert mass in the event of a sudden deflection of the hand-held device. Safety devices based on the principal of an inert mass are only activated by the jolting or jerking deflection of the housing. As a result, relatively large deflection angles can develop in hand-held devices using such a safety device which acts in a purely mechanical manner.

EP-B-O 486 853, a hand-held device is disclosed outfitted with loop spring couplings in the drive for the rotary spindle and includes a safety device cooperating with a detection device in the event the tool becomes jammed. The safety device is an additional loop screen coupling which can be electronically activated when jamming is detected and prevents rotation about a drive shaft by means of a brake spring. Accordingly, the safety device in this known hand-held device is not activated by a relatively slowly reacting inert mass. Instead, an electronic signal is generated when jamming is detected and the electronic signal causes current to be supplied to a magnet coil forming a component of an electromagnetic brake. The electromagnetic brake cooperated with a switching housing which results in a compression of the loop spring coupling and to a coupling of the drive shaft and housing, so that they are fixed relative to one another with respect relative rotation. This safety device is relatively complicated with respect to its construction and is designed only for hand-held devices outfitted with loop spring couplings in the drive for the rotary spindle. The loop spring is arranged at a distance from the drive shaft under normal operating conditions. When jamming occurs, this distance must be bridged for coupling the housing and the drive shaft so that they are fixed with respect to rotation relative to one another. This feature causes a certain delay in response of the safety device which can result in a deflection angle of the hand-held device unacceptable to the user.

SUMMARY OF THE INVENTION

Therefore, it is the primary object of the present invention to provide a hand-held device containing a safety device, so that, when jamming occurs, deflection angles of the hand-held device are prevented which are unacceptable for the user. The safety device has a very fast response characteristic and is simple in its construction. In particular, a hand-held device contains a safety device in combination with a detection device, for prompt detection of jamming and which can be activated by the detection device. Further, overloading of the driving motor, when the tool becomes jammed is capable of being prevented. Moreover, the hand-held device is sufficiently safe for the user, even when only a limited deflection at small swiveling angles is possible due to spatial factors. For example, when performing drilling work in corners in which the hand-held device rests against a wall.

In accordance with the present invention, a hand-held device, such as a drilling device, includes a rotary spindle located within and projecting out of the housing and serving to transmit rotational movement from a driving motor to a drilling tool. Further, a safety device is provided in the housing for preventing a deflection of the housing of the hand-held device about the axis of the rotary spindle in the event the tool secured to the spindle suddenly becomes jammed. The safety device can be activated by means of a detection device if the tool becomes jammed. The safety device is arranged inside the housing adjacent to the rotary spindle and includes at least two component parts which cooperate in frictional engagement in the event of activation of the safety device, with one of the component parts connected to the housing and the other connected to the rotary spindle. When the tool becomes jammed, the component parts, which cooperate in frictional engagement, couple the housing and the rotary spindle, such that they are fixed with respect to rotation relative to one another. Moreover, an overload slip clutch is provided in the drive to the rotary spindle and serves with the safety device.

The safety device is located directly adjacent to the rotary spindle and is activated by a signal generated by the detection device. Since the safety device includes two component parts, which cooperate in frictional engagement, these component parts can be adapted with respect to their dimensions or size with respect to normally occurring reaction torques. The component parts, cooperating in frictional engagement when activated, are arranged immediately adjacent to one another. Accordingly, only very small distances must be overcome to produce the frictional connection, whereby virtually no delays in coupling of the rotary spindle and housing occur so that they are fixed with respect to rotation relative to one another. In this way the swiveling angles developed at the housing are kept very small. The construction of the safety device, according to the invention, is effected in a very simple and economical manner and requires only a small amount of room inside the housing of the hand-held device. The overload slip clutch provided in the drive for the rotary spindle is arranged in series with the safety device. Under normal circumstances, it serves to protect the driving motor, especially in the event the tool becomes jammed. In addition, the series arrangement of the overload slip clutch offers the user additional protection, for example, when the hand-held device cannot deflect, because of spatial factors, and the detection device, which often determines the development of the jamming, based on the measurement of rotational or angular accelerations, does not respond. In such a situation, the safety device does not receive any control signals and, therefore, is also not activated. Instead, the overload slip clutch responds at a predetermined torque and separates the drive from the driving motor to the rotary spindle to protect the user.

Advantageously, a safety device can be activated electro-mechanically to provide the greatest possible safety for the user and to insure a dependable response of the safety device if the tool becomes jammed.

The safety device includes a thrust element pretensioned by a spring in the direction of frictional engagement. When the hand-held device is switched off, the thrust element is biased by the spring force to engage in frictional connection with the rotary spindle. Accordingly, the response of the safety device is ensured so as to be independent from error or defects.

In an advantageous embodiment of the invention, the spring-loaded thrust element is positioned in the magnetic field of a magnet coil supplied with current during operation of the device and the current is switched off when jamming is detected. In this manner, the safety device can be activated and the cooperating component parts of the safety device can be placed in frictional engagement. As a result, the activation of the safety device is reduced to the automatic actuation of a switching arrangement for supplying current to the magnet coil. During operation, the spring biased element is held back in the magnetic field against the spring force and is automatically released to effect the coupling of the housing and the drive for the rotary spindle side so that the housing and the spindle are fixed with respect to rotation relative to one another. The safety device is also automatically activated by selected arrangement of the invention in the event of a power outage.

Due to the fact that at least one of the cooperating component parts of the safety device comprises a replaceable friction facing, it is possible to replace this wear-prone part easily. The response characteristic of the safety device can also be influenced by the selection of a suitable friction facing.

The component part of the safety device connected to the rotary spindle is advantageously a circumferential flange which projects outwardly from the outer surface of the rotary spindle. The thrust element, axially displaceable in the magnetic field of the magnet coil, is pressed against a flat side of the flange by the spring force in the absence of the magnetic field. In this arrangement of the safety device, cooperation takes places between planar surfaces when the safety device is activated. Within the available space inside the housing, the surfaces can be sufficiently large to ensure a very fast response of the safety device. The flange and the planar surface at the thrust element are relatively simple and inexpensive to produce.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there are illustrated and described preferred embodiments of the invention.

BRIEF DESCRIPTION OF THE DRAWING

In the drawing:

FIG. 2 illustrates, in a side elevational view partly in section, an embodiment of the hand-held device according to the invention.

DETAILED DESCRIPTION OF THE INVENTION

Figure 1:
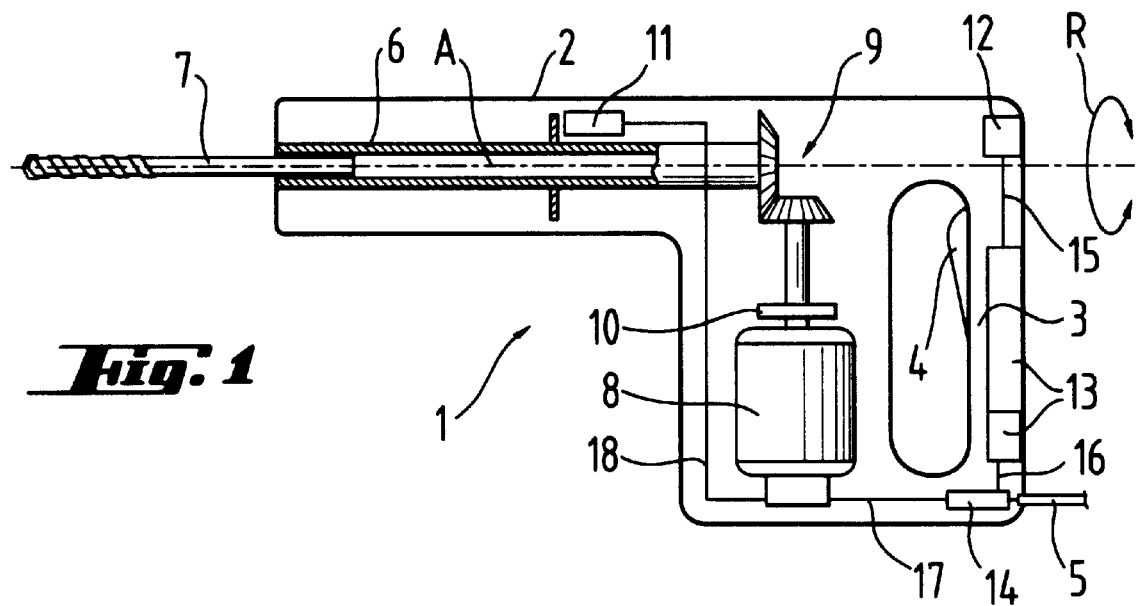
FIG. 1 is an schematic illustration of a hand-held device embodying the present invention.

In the schematic showing in FIG. 1, a hand-held device 1 is illustrated. The hand-held device 1 is a drilling device. Drilling devices of the generic type normally include a hammer mechanism for directing axial blows to the tool during operation. For sake of simplicity, the hammer mechanism is not shown in FIG. 1. The hand-held device 1 includes a housing 2 conventionally formed of plastics with a handle part 3 at one end. The hand-held device 1 is supplied with power, via a connection cable 5. A switch 4 located in the handle part 3 serves to place the hand-held device in operation. An axially extending rotary spindle 6 is located within the housing and projects out of it at the opposite end from the handle part 3 and serves to receive a tool, such as a drilling tool, which is driven by the rotary spindle. The rotary spindle 6 is connected via a drive 9 or transmission with a driving motor 8. The drive 9 transmits the rotational movement of the driving motor 8 to the rotary spindle 6 and the tool 7. The rotation of the rotary spindle about an axis A is shown in FIG. 1 by a double arrow R to illustrate the possibility of clockwise or counter-clockwise running of the rotary spindle 6 such as is selectable in many hand-held devices.

The hand-held device 1 contains a detection device 12 for the prompt detection of situations endangering the user due to jamming of the tool. The detection device 12 comprises sensors which detect a deflection of hand-held device 1 about the axis A of rotation of the rotary spindle 6. The detected measurement values are digitized and sent to an evaluating unit 13 with memory or storage units and computing units, for example, a micro-processor. The measured values are converted in the evaluating unit 13 into characteristic values or parameters of the rotational movement, for example, angular acceleration, rotating speed and deflecting angle. Based on these parameters, the anticipated degree of risk to the user is calculated based on presettable criteria, for example, by determining the anticipated deflection angle or the probability of a mishap. The values determined in the evaluating unit 13 are fed to a comparison unit 14 which generates a signal when a, preferably presettable, threshold value is exceeded. On one hand, such a signal is fed to the driving motor, to switch it off automatically, when an impermissibly high degree of risk to the user is detected. On the other hand, a signal generated by the comparison unit 14 activates the safety device 6 located adjacent the rotary spindle 6. The safety device cooperates with the detection device in that it is activated depending on the measured values detected by the sensors of the detecting device 12 and processed by the evaluating unit 13. The safety device 11 suppresses the deflecting movement of the housing about the axis of rotation A of the rotary spindle 6 whereby the housing 2 and the rotary spindle 6, blocked by tool 7, are coupled together and fixed so that there is no relative rotation between them.

An overload slip clutch 10 is provided in the drive 9 for the rotary spindle 6, in series with the safety device located adjacent to the rotary spindle 6. The series arrangement of the safety device 11, which can be activated automatically by the detection device 12, and the overload slip clutch 10 in the drive 9 for the rotary spindle 6, offers the tool operator or user the greatest possible degree of protection and prevents dangerous situations in which the user could be startled by high reaction torques. The detection device 12, the evaluating unit 13, the comparison unit 14, the driving motor 8 and the safety device 11 are connected by signal lines 15, 16, 17 and 18.

In FIG. 2, the hand-held device 1 is shown in partial section. In particular, this hand-held device is a hammer drill device outfitted with an axially directed hammer mechanism which during operation applies axially directed blows to the drilling tool 7 secured in a tool holder 71. The tool holder 71 is an axial continuation of the rotary spindle 6 and is connected with the rotary spindle so that they rotate together. The rotary spindle 6 is driven by the driving motor 8 via the transmission or drive 9. For this purpose, the teeth on a motor-shaft 81 engage with teeth of the overload slip clutch 10 which has a driving-output part or power take-off part on a shaft 92 so that it is fixed for rotation relative to the shaft. The shaft 92 is supported in a support plate 19 associated with the housing 2 and the end of the shaft 92 forms a straight bevel clear or bevel spur gear 91. The bevel spur gear 91 engages in the teeth of a toothed wheel 61, fixed to a rotary spindle 6 so that the wheel and spindle rotate together and transmit the rotating movement of the shaft 92 to the rotary spindle 6.

In addition, the motor shaft 81 also drives an upright drive shaft 20 of the hammer mechanism. An eccentrically arranged pin 21 projects from an upper end of the shaft 20 and is connected with an exciter piston 22 of the hammer mechanism guided in the hollow rotary spindle 6. Since the exciter piston 22 is articulated eccentrically at the shaft 20, the rotation of the drive shaft 20 is translated into a reciprocating movement of the exciter piston 22 in the interior of the rotary spindle 6. The exciter piston 22 cooperates with a flying piston 23 which is also axially displaceable in the rotary spindle 6. An air cushion is formed between the exciter piston 22 and the flying piston 23 and prevents the two pistons from colliding. During operation, the flying piston 23 strikes against an anvil member 24 projecting into the tool holder 72 for transmitting the axially directed hammer blows to the tool 7.

In case the tool 7 becomes jammed during operation, the hand-held device 1 is outfitted with the safety device 11 arranged immediately adjacent to the rotary spindle 6. When the safety device 11 is activated by the detection device 12, at least two component parts cooperate, one component part is connected to the rotary spindle 6 and the other is connected to the housing 2. For this purpose, the rotary spindle 6 is provided with a circumferential flange 62 extending around the circumference of the rotary spindle 6 and has a flat side facing the safety device and supporting a friction facing 63. Preferably, the friction facing 63 is detachably secured into the flange 62 so that it can be replaced as needed.

Figure 3:
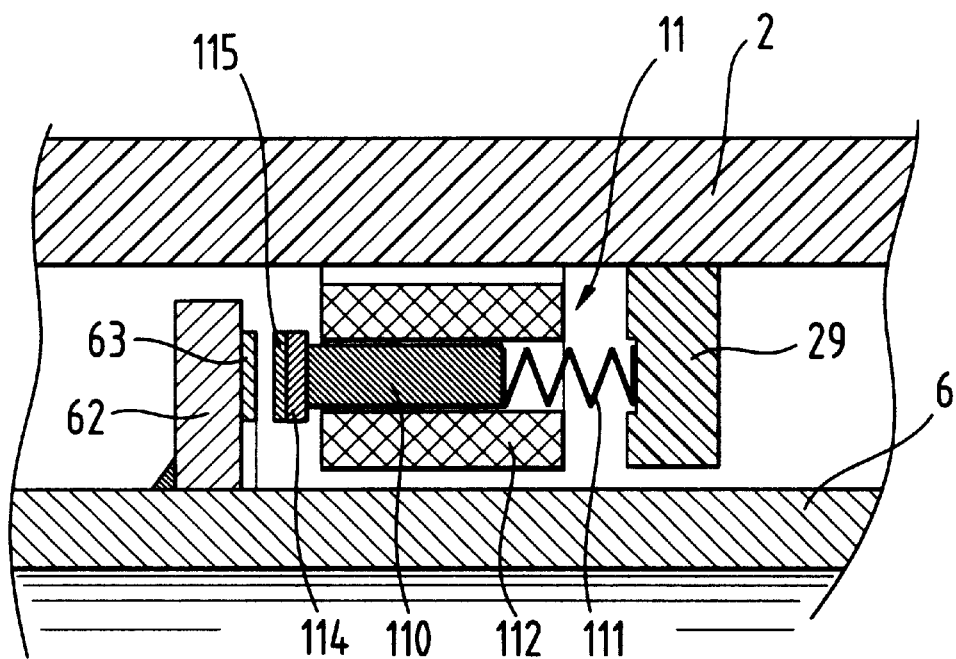
FIG. 3 is an illustration of the safety device displayed in FIG. 2 shown in section and on an enlarged scale.

In FIG. 3 the safety device is displayed on an enlarged scale. The safety device 11 comprises a thrust element 110, pretensioned by a spring 111 in the direction of the flange 62 secured to the rotary spindle 6. The spring 111, extends toward the flange 62 from a projection part 29 secured to the housing 2. The thrust element 110 is guided within and is axially displaceable relative to a magnet coil 112 mounted on the inside of the housing 2. The thrust element 110 has a brake shoe 114 mounted on its end facing the flange 62 and the brake shoe 114 has a friction facing 115. The friction facing 115 and/or the brake shoe 114 are advantageously arranged so as to be detachable and can be replaced as needed. The friction facing 63 is located opposite the friction facing 115, as is shown in FIG. 3. Under normal operating conditions, the magnet coil 112 is supplied with current during operation of the device and the thrust element 110 is held in a position, spaced from the flange 62, in the magnetic field of the magnet coil 112 against the biasing force of the spring 11 so that it is spaced from the friction facing 63 on the flange 62. When jamming of the tool 7 is detected, a signal is generated which interrupts the flow of current to the magnet coil 112. The magnetic field holding the thrust element at a distance from the flange 62 collapses and the spring 111 biases the thrust element 110 against the flange 62. The friction facings 63, 115 on the flange 62 and the brake shoe 114, respectively, couple the housing 2 and the spindle 6 by frictional force so that they do not rotate relative to one another. Since the tool 7 is locked, the rotary spindle 6 is also locked. Accordingly, as a result of the coupling of the housing 2 to the locked rotary spindle 6 so that they are fixed with rotation relative to one another, the housing 2 is also secured against a deflection caused by the reaction torque. Since the entire mass of the hand-held device 1 is coupled with the tool 7 so as to be fixed with respect to rotation relative to it when jamming occurs, the tool 7 can also be freed and the drilling process can continue without interruption.

The safety device 11 is activated via the detection device 12 which also cooperates with the driving motor 8. At the same time that the safety device 11 is activated, the driving motor is switched off. The residual torque of the driving motor is received by the overload slip clutch 10 arranged in series with the safety device 11 and the drive 9 is separated from the driving motor 8. When the hand-held device is placed in operation again, after the tool 7 has been freed or released, the original state is restored and the coupling of the housing 2 with the rotary spindle 6 is canceled and they can rotate relative to one another, when current is supplied to the magnet coil 112. In this way, the hand-held device is ready for any possible reoccurrence of the jamming of the tool 7 so that the tool user is afforded the greatest possible protection.

While specific embodiments of the invention have been shown and described in detail to illustrate the inventive principles, it will be understood that the invention may be embodied otherwise without departing from such principles.

We claim:

1. Motor-operated hand-held device comprises a housing (2), an axially extending spindle (6) mounted in and projecting out of said housing for transmitting rotational movement from a driving motor (8) located in said housing (2) to a tool (7) secured to said spindle (6), said spindle (6) and tool (7) having a common axis (A) of rotation, a safety device (11) located within said housing (2) for preventing a deflection of said housing (2) about the axis (A) of said rotary spindle (6) in the event during operation of said device, said tool (7) becomes suddenly jammed, a detection device (12) in said housing for activating said safety device (11) in the event said tool (7) becomes jammed, an overload slip clutch (10) positioned in a means (9) for driving said rotary spindle (6), said safety device (11) located within said housing adjacent to said spindle (6) and comprising at least two component parts (62, 114), arranged to cooperate in frictional engagement when said safety device is activated, one of said component parts being connected to said housing and the other said component part being connected to said rotary spindle (6), when the tool (7) becomes jammed said component parts couple said housing (2) and said rotary spindle (6) by frictional force, so that said housing and rotary spindle are fixed with respect to rotation relative to one another, and an overload slip clutch (10) is a part of the said means (9) for driving said rotary spindle and is arranged in series with said safety device (11).

2. Motor-operated hand-held device set forth in claim 1, wherein said safety device (11) is activated electromechanically when it is detected that said tool (7) is jammed.

3. Motor-operated hand-held device, as set forth in claim 2, wherein said component parts (62, 110), cooperating with one another when the safety device is activated, are pretensioned one relative to the other by a spring force (111), so that said housing (2) and said rotary spindle (6) are coupled together so as to be fixed with respect to rotation relative to one another in the switched off state of the hand-held device (1).

4. Motor-operated hand-held device, as set forth in claim 3, wherein one of the said component parts (114) is a spring loaded (111) thrust element (110) supported within and axially displaceable through a magnetic field of a magnet coil (112) supplied with current during normal operation of said hand-held device (1) and the current to said magnet coil being switched off when a jamming of the tool (7) is detected, so that the cooperating said component parts of the safety device (11) are displaced into frictional engagement by said spring-loaded thrust element (111, 110).

5. Motor-operated hand-held device, as set forth in claim 4, wherein the other one of said component parts (62) comprises a flange (62) encircling and secured to said rotary spindle (6) and having a planar contact surface.

6. Motor-operated hand-held device, as set forth in claim 5, wherein said flange extends circumferentially around said rotary spindle (6).

7. Motor-operated hand-held device, as set forth in claim 3, 4 or 5, wherein at least one of the said cooperating component parts (62, 114) of said safety device (11) has a friction facing (115, 63) thereon in facing relationship with the other one of said component parts.

8. Motor-operated hand-held device, as set forth in claim 7, wherein said friction facing (115, 63) is replaceable.

* * * * *